April 13, 1926.
C. A. GLASS
OIL TANK
Filed March 28, 1924
1,580,194
3 Sheets-Sheet 1
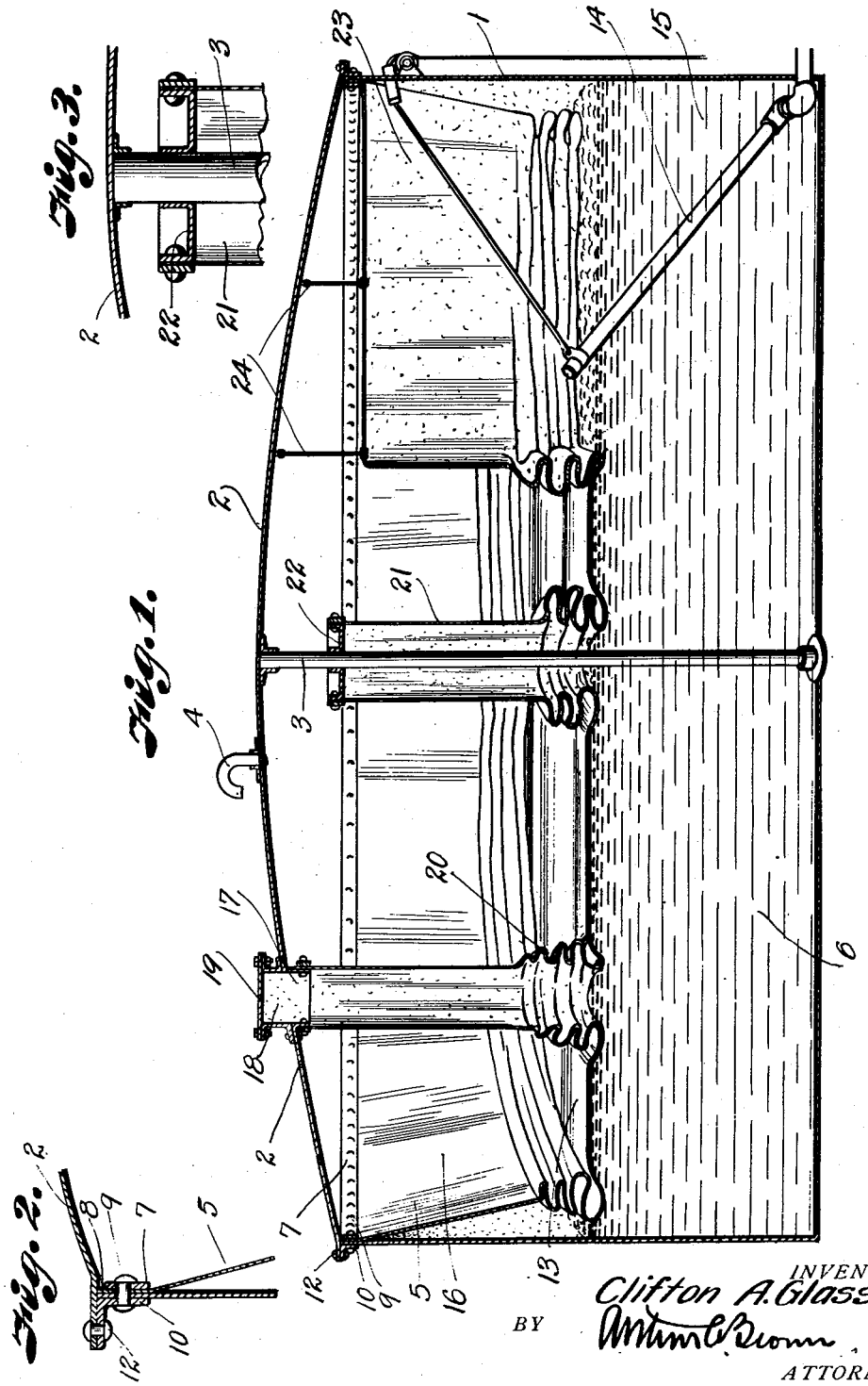
INVENTOR
Clifton A. Glass.
BY
ATTORNEY April 13, 1926.
C. A. GLASS
OIL TANK
Filed March 28, 1924     3 Sheets-Sheet 2
1,580,194
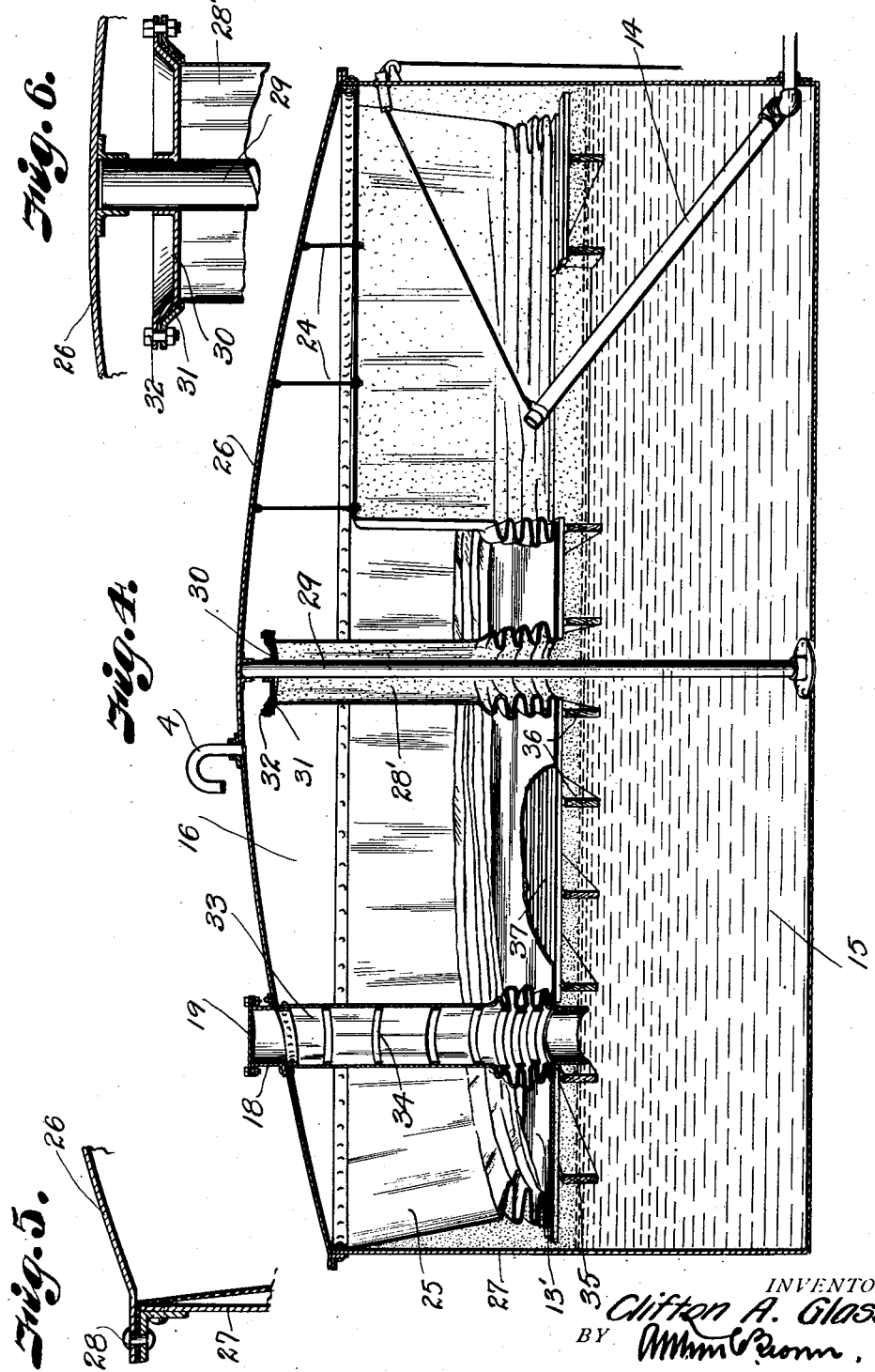
INVENTOR
Clifton A. Glass
BY
ATTORNEY April 13, 1926.
C. A. GLASS
OIL TANK
Filed March 28, 1924   3 Sheets-Sheet 3
1,580,194
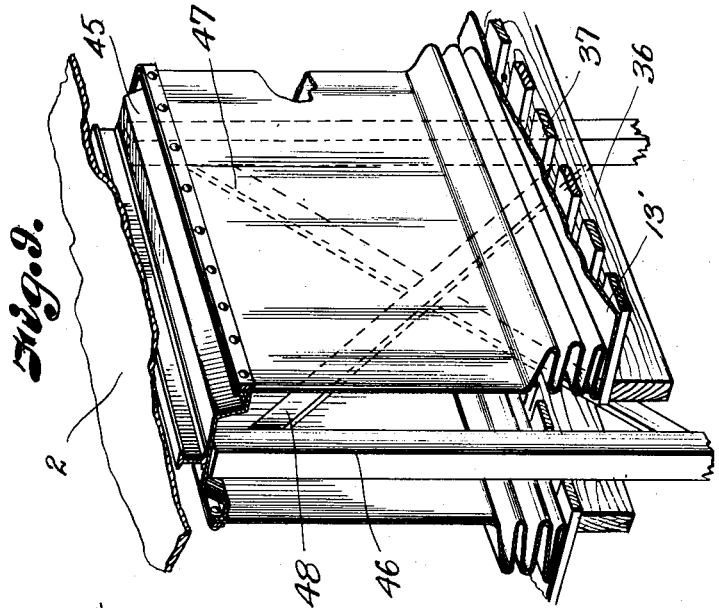
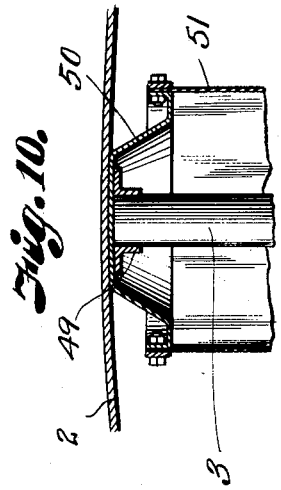
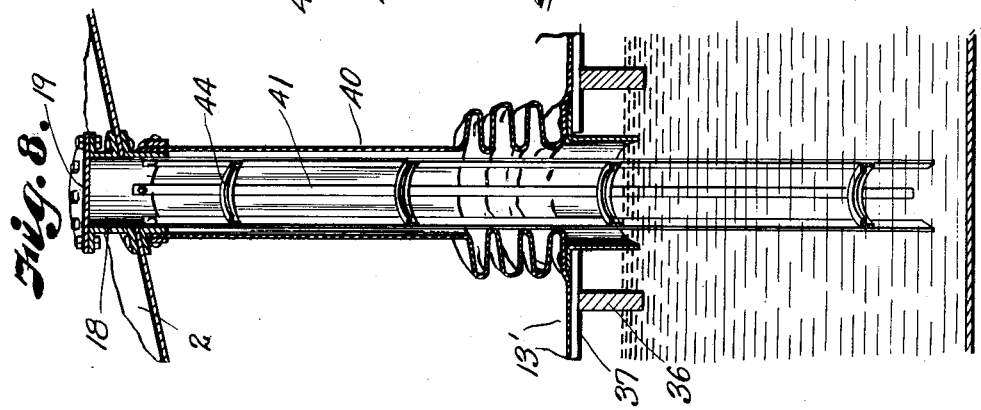
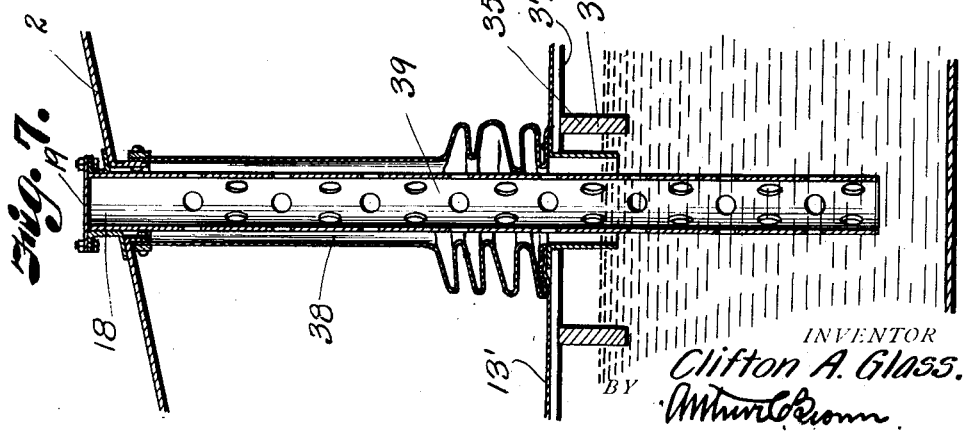
INVENTOR
Clifton A. Glass.
BY
ATTORNEY Patented Apr. 13, 1926.

1,580,194

UNITED STATES PATENT OFFICE.

CLIFTON A. GLASS, OF KANSAS CITY, MISSOURI.

OIL TANK.

Application filed March 28, 1924. Serial No. 702,599.

*To all whom it may concern:*

Be it known that I, CLIFTON A. GLASS, a citizen of the United States, residing at Kansas City, in the county of Jackson and State of Missouri, have invented certain new and useful Improvements in Oil Tanks; and I do declare the following to be a full, clear, and exact descriptoon of the invention, such as will enable others skilled in the art to which it appertains to make and use the same, reference being had to the accompanying drawings, and to the figures of reference marked thereon, which form a part of this specification.

This invention relates to oil tanks and the primary object of the invention is to provide a novel and efficient means for preventing loss of the more volatile constituents of petroleum by evaporation during storage and the incidental filling and emptying of the tanks. The losses of the more volatile ends of stored petroleum is occasioned largely, if not entirely by the breathing of the tank in which the petroleum is stored, that is by the expelling of petroleum vapor ladened air when the tank is being filled with oil, or by expelling of petroleum vapor ladened air due to the expansion of the air in the upper portion of the tank caused by a rise in temperature or by change in barometric pressure, it being important to note that especially in the larger sizes, the tanks cannot be entirely filled with oil because a very slight expansion of the oil occasioned by a change in temperature will rupture the tank or at least seriously damage it. Therefore it will be apparent that it is important to provide some efficient means to take care of the conditions encountered in actual practice and it is the purpose of my invention to provide means which will prevent evaporation losses and prevent danger of rupture of the tank, particularly when the air is expelled, due to the fact that it is being displaced by liquid as well as to prevent the atmospheric air introduced into the tank upon a drop in the level of the oil from becoming impregnated with the highly volatile lighter constituents of the petroleum group. In other words the air is admitted into the tank and expelled therefrom without coming into contact with the petroleum so petroleum vapor losses cannot occur.

With these ends in view, the invention consists in certain novel parts and combination of parts, all of which will be specifically referred to hereinafter, reference being had to the accompanying drawings, in which Fig. 1 is a vertical longitudinal sectional view through a tank constructed in accordance with my invention.

Fig. 2 is a detailed sectional view showing the manner of securing the floating roof to the tank.

Fig. 3 is a sectional view of a hanger on the center pole showing part of the floating roof secured thereto.

Fig. 4 is a vertical longitudinal sectional view through a modified form of tank and roof.

Fig. 5 is a fragmentary sectional view of part of the tank showing a modified method of securing the roof to the tank.

Fig. 6 is a sectional view of a hanger for the center pole showing the method of securing the roof to the hanger.

Fig. 7 is a modified form of gage well showing a modified means for maintaining the walls of the well extended.

Fig. 8 is a further modified form of gage well.

Fig. 9 is a modification showing the method of securing the roof in place where the roof supports are braced, and Fig. 10 is a further modified form of a device for supporting the roof from the center of the tank.

The tank 1 (Fig. 1) may be constructed of any material in the usual way and it will preferably, though not necessarily be provided with a water shedding deck or roof 2. The roof 2 may consist of plates of relatively light material supported upon one or more vertical posts or stanchions 3 or it may be entirely supported from the angle 10 hereinafter described.

According to my invention, it will be unnecessary to construct the roof of very heavy material because the roof will not be subjected to pressure from within, due to the expansion of gaseous vapors therein, because the breather pipe 4 will always be opened to atmosphere and when the pressure in the tank above the floating roof exceeds the atmospheric pressure it will exhaust through the breather pipe 4 and when the pressure in the tank above the floating roof is less than atmospheric pressure, atmospheric air will flow into the tank through the breather pipe 4.

In Fig. 1 the floating roof is shown as comprising a curtain 5 of flexible material impervious to moisture and preferably impregnated with a substance insoluble in petroleum or petroleum derivatives. The curtain
5 rests upon the liquid or petroleum 6 in the tank 1 and its periphery is fastened to the wall of the tank by a strap 7 clamping the upper edge 8 to the wall of the tank, the strap 7 being secured to the wall of the tank by rivets 9 which also pass through the angle bar 10 on the outside of the tank upon which the periphery of the roof 2 rests to be secured by suitable fastening devices, for example rivets 12.
The diameter of the curtain 5 is sufficiently less than the diameter of the tank to allow the curtain to rest upon the oil in the form of a bowl with flexible walls, the flexible walls adapted to fold when the effective roof portion 13 rises with the rise of the level of the liquid introduced into the tank through the swing pipe 14 in the usual manner and since the entire curtain is so constructed that it separates the tank into a lower liquid compartment 15 and an upper atmospheric compartment 16, it will be apparent that communication between the two compartments will be entirely cut off and that the only access that the oil can have with atmosphere is through the gage well 17 connected to the gage hole 18 normally sealed by a cover 19. The well 17 may consist of a flexible tubular member as that of the flexible roof or curtain, so that its walls may fold into a series of folds 20 when the effective roof portion 13 rises.

The center pole or stanchion 3 extends through a tubular portion 21 of the curtain, tain, the tubular portion 21 of the curtain, being suspended from a flanged disk or hanger 22 which is fastened to the member 3 as will be clearly seen in Fig. 1. The tubular member 21 corresponds in form substantially to the gage well 17. The swing pipe 14 may be swung above the level of the oil or liquid so I have formed the curtain with a swing pipe compartment 23 above the oil level, the roof of the compartment being supported from the roof 2 by hangers 24. Since the effective roof portion 13 of the curtain is flexible and of relatively light material to float upon the body of oil and since the curtain provides an air tight connection to separate atmospheric air from the interior of the tank, it will be apparent that the roof may rise and fall without allowing petroleum vapors to come into contact with atmospheric air in compartment 16 or vice versa. Therefore when the roof portion 13 of the curtain rises due to the introduction of oil through the swing pipe 14, the air in the top of the tank will be forced out to atmosphere but since this air has never come into contact with any of the hydrocarbons in the tank, it is obvious that it will be expelled devoid of petroleum vapors.

When oil is removed from the tank so that the roof portion 13 drops, there will be a partial vacuum set up in the tank compartment 16, or at least the air in the compartment 16 will be put under tension, due to the stretch it receives by the movement of the roof portion 13 toward the bottom of the tank so fresh atmospheric air will pass through the breather pipe 4 until the pressure in the compartment 16 and atmosphere pressure equalizes.

In view of the fact that the floating roof is of flexible material and in view of the fact that it completely seals the oil away from atmosphere, it will be apparent that there will be but slight formation of petroleum vapors in the tank and whatever petroleum vapors do form will be trapped in the swing pipe compartment, the tubular portion of the roof around the pipe 3 and the tubular portion in line with the gage hole or thief opening 18. The roof 2 is not an essential part of the tank, but I prefer to employ some form of water shed and sun shade to protect the curtain 5 against the action of the elements.

In Fig. 4 I have disclosed a slightly modified form of curtain in which the curtain 25 conforms generically to the curtain 5 in Fig. 1, the edge of the curtain however may be fastened between the roof 26 of the tank and the wall 27 thereof by suitable fastening devices such as rivets 28 (see Fig. 5) and the tube or well portion 28' around the center pole 29 is fastened to a hanger 30 by means of a clamping ring 31 secured thereto by bolts 32 (Fig. 6). The tubular portion 33 for the gage well is adapted to be held in extended position by hoops or rings 34 which prevent the wall of the gage hole well from collapsing and in order to insure proper buoyancy of the floating roof, I prefer to mount the portion 13' upon a float or raft 35 preferably made up of wooden timbers 36 and strips 37, thus the roof portion of the curtain will be efficiently supported upon the raft. In all other respects than these noted, the curtain 25 is substantially like the curtain 5 shown in Fig. 1.

Other means may be used for maintaining the tubular portions 17, 21, 34 or 28' extended, for example, in Fig. 7 I have shown a modified form of gage hole well designated 38 in which there is a perforated tube 39 to prevent the tubular member 38 from collapsing inwardly, thus insuring that the gager may always drop his gage rod or gage line through the gage hole.

In Fig. 8 I have shown a well 40 held distended by a frame consisting of longitudinals 41 and bands 44. In Fig. 9 I have shown channel members 45 supported from verticals 46 and having flat walls 47 on each side of the braces 48. These walls 47 correspond to the tubular members about the verticals heretofore described except that the spaces between them are not round as in the preferred forms. In Fig. 10 I have shown a further modified form for securing the tubular member 21 to the center of the tank. In this form the vertical pole 3 is received in a socket 49 in a hanger 50, the hanger carrying the curtain tubular portion 51. Other modifications may occur from time to time, so I do not wish to be limited to the exact details of construction shown as these are merely illustrative to the generic embodiment of my invention.

It will be apparent from the foregoing that the tank may breathe when being filled or emptied or when undergoing changes of temperature or when undergoing changes in barometric pressure without exhaling or passing out vapor laden air, so that the liability of losing the lighter ends of the petroleum group along with the air forced out through the tank will be entirely eliminated and it will also be apparent that means is provided for the free expansion of the oil due to changes in temperature and that the tank may be easily filled through the swing pipe, the floating roof lifting or rising with the rise of level of the oil within the tank and falling when the liquid is discharged from the tank and that it will further be apparent that the roof 2 need not be air or gas tight, but it should be of such construction that it will shed water and protect the curtain from the rays of the sun and from the action of accumulated dust, dirt and other foreign substances.

I prefer to so construct the tank so that it will be provided with some form of a covering to protect the floating roof from the possibility of being over-loaded by sleet, or sand and thereby become so heavily burdened that the floating roof will submerge or become damaged. I may utilize any suitable flexible material so as to keep the hydrocarbon vapors in the lower compartment of the tank, so while not as efficient as a perfectly water proof and air proof curtain, a curtain which would even leak to some extent would effect a greater saving of the contents of the tank because even a porous material resting on the body of oil, would to an extent cut down the evaporation losses.

Attention is also called to the fact that inasmuch as the curtain is flexible so that it can flex or bulge inwardly away from the wall of the tank, that at no time can there be any appreciable pressure in the liquid compartment 6 because if pressure is generated in the compartment 6 by the formation of vapors due to heat, the curtain will give until the pressure within the compartment 6 will be at substantially atmospheric pressure so danger of rupturing the curtain due to excessive pressure in compartment 6 will be entirely eliminated.

It is intended in the following claims to cover any form of flexible wall in an oil tank, the wall being so disposed that at least a portion of it will lie upon the body of oil to prevent evaporation within the tank.

What I claim and desire to secure by Letters-Patent is:

1. An oil tank comprising rigid side walls and a closed top, a horizontal curtain within the tank having its periphery spaced from the wall of the tank to permit the curtain to float freely within the tank, the curtain having a flexible side wall sealed at its upper edge to the upper portion of the tank wall to separate the part of the tank above the curtain from the part of the tank below the curtain, irrespective of the height of liquid within the lower part of the tank, the roof having a vent affording open communication between the upper part of the tank and atmosphere.

2. An oil tank comprising rigid side walls and a closed top, a horizontal curtain within the tank having its periphery spaced from the wall of the tank to permit the curtain to float freely within the tank, the curtain having a flexible side wall sealed at its upper edge to the upper portion of the tank wall to separate the part of the tank above the curtain from the part of the tank below the curtain, irrespective of the height of liquid within the lower part of the tank, the roof having a vent affording open communication between the upper part of the tank and atmosphere, the tank having a gauge hole and a well of flexible material communicating with the gauge hole and with the lower part of the tank, and sealed at its opposite ends to the roof and to the curtain to prevent escape of vapors to the upper portion of the tank.

3. A liquid container having a vertical wall and a bottom, a substantially air tight curtain secured to the wall of the container and co-operating with the wall and bottom of the container to provide a substantially air tight liquid compartment, the curtain having a swing pipe compartment and a swing pipe associated with the container and having its free end movable in the swing pipe compartment.

4. An oil tank having a vertical wall, a bottom and a top, a substantially air tight curtain secured to the upper portion of the wall lying upon the body of the oil, the curtain being provided with a swing pipe opening surrounded on two sides and at one end by vertical walls, one end being open to the space above the oil, a top connecting the vertical walls to provide a swing pipe chamber, and means supporting the top of the swing pipe chamber from the top of the oil tank.

5. An oil tank having a vertical wall, a bottom and a top, a substantially air tight curtain secured to the upper portion of the wall lying upon the body of the oil, the curtain being provided with a swing pipe opening surrounded on two sides and at one end by vertical walls, one end being open to the space above the oil, a top connecting the vertical walls to provide a swing pipe chamber, means supporting the top of the swing pipe chamber from the top of the oil tank, and a frame fastened to that part of the curtain resting upon the oil.

6. An oil tank having a vertical wall, a bottom and a top, a substantially air tight curtain secured to the upper portion of the wall lying upon the body of the oil, the curtain being provided with a swing pipe opening surrounded on two sides and at one end by vertical walls, one end being open to the space above the oil, a top connecting the vertical walls to provide a swing pipe chamber, means supporting the top of the swing pipe chamber from the top of the oil tank, and a skeleton frame fastened to that part of the curtain resting upon the oil.

In testimony whereof I affix my signature.

CLIFTON A. GLASS.